(12) United States Patent
Zhang et al.

(10) Patent No.: US 10,880,864 B2
(45) Date of Patent: Dec. 29, 2020

(54) METHODS AND APPARATUSES FOR WAVEFORM INDICATION IN HIGH-FREQUENCY BANDS

(71) Applicant: QUALCOMM Incorporated, San Diego, CA (US)

(72) Inventors: Xiaoxia Zhang, San Diego, CA (US); Ananta Narayanan Thyagarajan, Bangalore (IN); Kapil Bhattad, Bangalore (IN); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/280,271

(22) Filed: Feb. 20, 2019

(65) Prior Publication Data
US 2019/0261315 A1 Aug. 22, 2019

Related U.S. Application Data

(60) Provisional application No. 62/634,082, filed on Feb. 22, 2018.

(51) Int. Cl.
*H04W 72/00* (2009.01)
*H04W 56/00* (2009.01)
(Continued)

(52) U.S. Cl.
CPC ....... *H04W 72/005* (2013.01); *H04J 11/0069* (2013.01); *H04L 1/00* (2013.01);
(Continued)

(58) Field of Classification Search
CPC ...... H04J 11/0069; H04L 1/00; H04L 1/0001; H04L 27/0008; H04L 27/0012;
(Continued)

(56) References Cited

U.S. PATENT DOCUMENTS

2010/0177697 A1* 7/2010 Tanno .................. H04L 1/0071
370/328
2018/0049233 A1* 2/2018 Luo ..................... H04L 27/2623
(Continued)

FOREIGN PATENT DOCUMENTS

EP 2169865 A1 3/2010

OTHER PUBLICATIONS

AT&T: "Prach Design for NR", 3GPP Draft; R1-1707756 Prach Design for NR, 3rd Generation Partnership Project (3GPP), Mobile Competence Centre, 650, Route Des Lucioles, F-06921, Sophia-Antipolis Cedex, France, vol. RAN WG1, No. Hangzhou, China, May 15, 2017-May 19, 2017 May 7, 2017 (May 7, 2017), XP051263107, Retrieved from the Internet:URL:http://www.3gpp.org/ftp/tsg_ran/WG1_RL1/TSGR1 89/Docs/[retrieved on May 7, 2017]sections 1-3.

(Continued)

*Primary Examiner* — Kashif Siddiqui
(74) *Attorney, Agent, or Firm* — QUALCOMM Incorporated

(57) ABSTRACT

There is a large chunk of unlicensed/shared high-frequency spectrum above the 5G radio frequency that begin to be utilized for 5G applications. 5G currently supports a limited number of waveforms. The other waveforms may be beneficial to the shared high-frequency bands, such as SC-QAM/SC-FDM for downlink transmission and SC-QAM for uplink transmission to improve link budget and to reduce complexity. A method, apparatus, and computer-readable medium at a user equipment (UE) are disclosed to determine a first waveform for a broadcast channel, based in part on a received synchronization block signal from a base station. Then the UE further determines a second waveform for at least one signaling channel, based in part on the received broadcast channel.

29 Claims, 12 Drawing Sheets

(51) Int. Cl.

| | | |
|---|---|---|
| *H04W 74/08* | (2009.01) | |
| *H04L 27/26* | (2006.01) | |
| *H04W 8/24* | (2009.01) | |
| *H04J 11/00* | (2006.01) | |
| *H04L 27/00* | (2006.01) | |
| *H04L 5/00* | (2006.01) | |
| *H04L 27/36* | (2006.01) | |
| *H04W 74/00* | (2009.01) | |
| *H04L 1/00* | (2006.01) | |
| *H04L 5/14* | (2006.01) | |

(52) U.S. Cl.
CPC .......... *H04L 5/0048* (2013.01); *H04L 5/0053* (2013.01); *H04L 5/0092* (2013.01); *H04L 27/0008* (2013.01); *H04L 27/0012* (2013.01); *H04L 27/2602* (2013.01); *H04L 27/2666* (2013.01); *H04L 27/362* (2013.01); *H04W 8/24* (2013.01); *H04W 56/0005* (2013.01); *H04W 56/0015* (2013.01); *H04W 74/006* (2013.01); *H04W 74/0833* (2013.01); *H04L 5/0023* (2013.01); *H04L 5/14* (2013.01)

(58) Field of Classification Search
CPC ............. H04L 27/2602; H04L 27/2666; H04L 27/362; H04L 5/0023; H04L 5/0048; H04L 5/0053; H04L 5/0092; H04L 5/14; H04W 56/0005; H04W 56/0015; H04W 72/005; H04W 74/006; H04W 74/0833; H04W 8/24
See application file for complete search history.

(56) References Cited

U.S. PATENT DOCUMENTS

| | | | | |
|---|---|---|---|---|
| 2018/0219664 | A1* | 8/2018 | Guo | H04W 24/10 |
| 2018/0324843 | A1* | 11/2018 | Lee | H04W 72/1289 |
| 2019/0037605 | A1* | 1/2019 | Agiwal | H04W 74/0833 |
| 2019/0200306 | A1* | 6/2019 | Ko | H04W 16/28 |
| 2019/0306820 | A1* | 10/2019 | Jiang | H04W 56/0015 |

OTHER PUBLICATIONS

CATT: "Discussion on NR 4-Step RA Procedure", 3GPP Draft; R1-1700185, 3rd Generation Partnership Project (3GPP), Mobile Competence Centre, 650, Route Des Lucioles, F-06921, Sophia-Antipolis Cedex, France, vol. RAN WG1, No. Spokane, USA, Jan. 16, 2017-Jan. 20, 2017 Jan. 16, 2017 (Jan. 16, 2017), XP051207725, Retrieved from the Internet: URL:http://www.3gpp.org/ftp/Meetings_3GPP SYNC/RAN1/Docs/ [retrieved on Jan. 16, 2017], 4 pages.

CATT: "NR RACH Procedure", 3GPP Draft; R1-1611375, 3rd Generation Partnership Project (3GPP), Mobile Competence Centre; 650, Route Des Lucioies; F-06921 Sophia-Antipolis Cedex; France, vol. RAN WG1, No. Reno, USA; Nov. 14, 2016-Nov. 18, 2016 Nov. 13, 2016 (Nov. 13, 2016), XP051175356, Retrieved from the Internet: URL:http://www.3gpp.org/ftp/Meetings_3GPP_SYNC/RAN1/Docs/ [retrieved on Nov. 13, 2016], 4 pages.

International Search Report and Written Opinion—PCT/US2019/018892—ISA/EPO—dated May 16, 2019.

* cited by examiner

METHODS AND APPARATUSES FOR WAVEFORM INDICATION IN HIGH-FREQUENCY BANDS

CROSS-REFERENCE TO RELATED APPLICATION(S)

This application claims the benefit of U.S. Provisional Application Ser. No. 62/634,082, entitled "METHODS AND APPARATUSES FOR WAVEFORM INDICATION IN HIGH-FREQUENCY BANDS" and filed on Feb. 22, 2018, which is expressly incorporated by reference herein in its entirety.

BACKGROUND

Field

The present disclosure relates generally to wireless communication systems, and more particularly, to methods and apparatuses waveform indication in high-frequency bands.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In particular wireless technologies and standards such as the evolving 3GPP 5G New Radio (NR) standard, particular high frequency transmission waveforms and protocols have been proposed. For example, for NR millimeter wave (mmWave) transmissions with RF carrier frequencies less than 60 GHz, orthogonal frequency division multiplexing (OFDM) may be used as the transmission waveform for downlink (DL) transmissions. As even higher RF carrier frequencies above 60 GHz begin to be utilized, due to the severe propagation loss in the high RF carrier frequencies, the high peak-to-average power ratio (PAPR) with OFDM waveform may affect the link budget and the coverage area. Thus, it becomes advantageous to use other single carrier waveforms for DL transmissions that afford lower PAPRs at these higher frequencies, such as Discrete Fourier Transform spread OFDM (DFT-S-OFDM) and single carrier QAM waveform. One example DFT-S-OFDM is a SC-FDM. Accordingly, it may be advantageous to utilize multiple types of waveforms for higher RF frequency transmission to capitalize on the respective advantages afforded by each type of waveform. For example, the NR standard might incorporate both OFDM and single carrier waveform (such as DFT-s-OFDM and SC-QAM) for DL transmissions for RF carrier frequencies above 60 GHz.

Some multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

NR may support various wireless communication services, such as Enhanced mobile broadband (eMBB) targeting wide bandwidth (e.g. 80 MHz beyond), millimeter wave targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Wireless communication systems may also include, or support networks used for vehicle-based communications, also referred to as vehicle-to-everything (V2X), vehicle-to-vehicle (V2V) networks, and/or cellular V2X (C-V2X) networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network). The vehicle-based communication networks may support a safe, always-connected driving experience by providing intelligent connectivity where traffic signal/timing, real-time traffic and routing, safety alerts to pedestrians/bicyclist, collision avoidance information, etc., are exchanged.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Current NR standards related to waveforms mostly apply up to a specific radio frequency, such as 52.6 GHz. There is a large section of unlicensed/shared spectrum above that radio frequency that begin to be utilized for 5G applications. The unlicensed/shared spectrum may be referred to as high-frequency bands in the present disclosure. The NR-supported waveforms currently are limited to OFDM on downlink (DL) and SC-FDM/OFDM on uplink (UL).

Support of the other waveforms for the high-frequency bands, such as SC-QAM/SC-FDM for DL transmissions and SC-QAM for UL transmissions may help improve link budget and to reduce complexity. When a node or a UE supports multiple waveforms, a switching between different waveforms may also be possible.

In another example aspect, support of multiple waveform may allow mixed waveform scenario. In a mixed waveform scenario, one particular waveform is supported for one section of radio frequency while another waveform may be used for a different section of the radio frequency. For example, OFDM may the waveform choice for the radio frequency around 500 MHz while SC-QAM may be used for the radio frequency around 2 GHz. Flexible waveform choices may also be applied to physical channels for better transmission efficiency and link budget. For example, SC-FDM/OFDM may be supported for synchronization/PRACH/PDCCH/PUCCH and while SC-QAM may be supported for PDSCH/PUSCH.

Thus, there is a need for a method, apparatus, and computer-readable medium in a NR system for flexibly signaling the waveforms supported by either a gNB or a UE to the other party. The method may include indicating to a plurality of UEs a first waveform via synchronization signal block for a physical broadcast channel and via different locations of primary synchronization signal (PSS), secondary synchronization signal (SSS), and physical broadcast channel (PBCH), and PBCH demodulation reference signal within the SS block.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
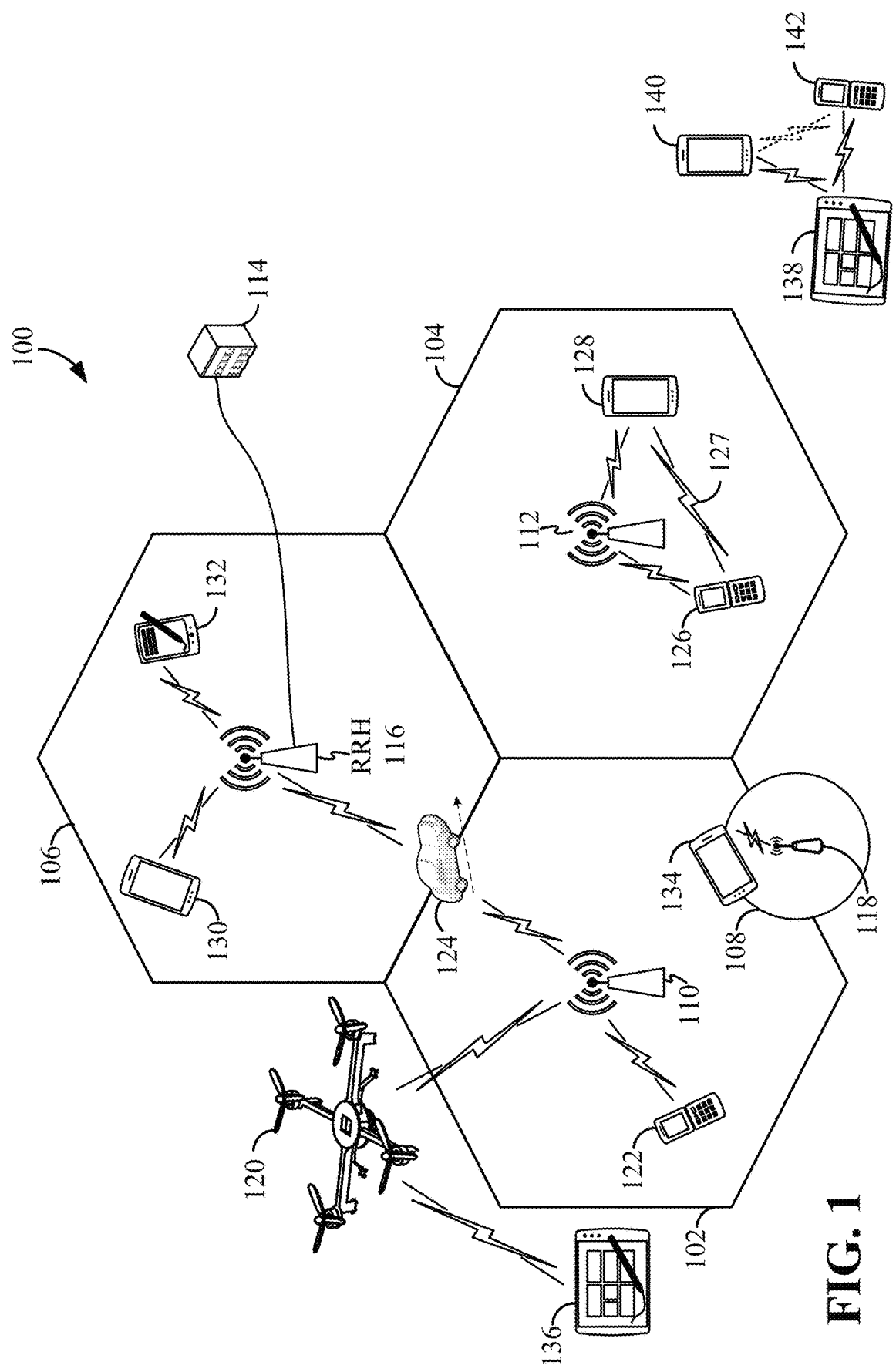
FIG. 1 is a conceptual diagram illustrating an example of a radio access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In the following disclosure, the present methods and apparatus discussed provide synchronization (synch) channel structures and PBCH that may be used to support multiple waveforms types. In particular, a synchronization channel and PBCH design options supporting multiple waveforms are disclosed.

It is noted that in proposed 3GPP NR standards, for a UE or scheduled device acquiring connection with a cell, such as an eNB or gNB effectuating the cell, a transmitted synchronization channel structure typically within a slot or subframe is used for synchronization. In the 3GPP NR standards for frequencies below 60 GHz, the synch channel structure comprises synchronization signal (SS) blocks that may be time division multiplexed (TDM) and may each include a Primary Synchronization signal (PSS), a Secondary Synchronization signal (SSS), and the PBCH, which is typically to be read after the other components in an SS block. For frequencies above 60 GHz, while the 3GPP NR standard has not yet established, either the same or a similar collection of synchronization sub-channels will likely be utilized, including a channel carrying broadcast system information, such as the PBCH. Also, since a broadcast channel such as the PBCH is broadcast to UEs in a cell and needs to reach edges of the cell area, it may be desirable in many cases to use a low PAPR waveform (e.g., DFT-S-OFDM or SC-QAM) for such broadcast channels. However, OFDM may be advantageous in other situations in order to lower the complexity at a transmitter or some UEs in the system may not support the reception of single carrier waveform. Accordingly, the present methods and apparatus propose indicating multiple waveforms between a base station and a UE via SS blocks, system information block, and random access messages, as will be discussed in more detail later herein. Per 3 gpp terminology, the PBCH is also part of synch channel, and thus part of each SS block, just like PSS and SSS.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

Legacy compatibility: may refer to the capability of a 5G network to provide connectivity to pre-5G devices, and the capability of 5G devices to obtain connectivity to a pre-5G network.

mmWave: millimeter-wave. Generally refers to high frequency bands above 24 GHz, which can provide a very large bandwidth.

Beamforming: directional signal transmission or reception. For a beamformed transmission, the amplitude and phase of each antenna in an array of antennas may be precoded, or controlled to create a desired (i.e., directional) pattern of constructive and destructive interference in the wavefront.

MIMO: multiple-input multiple-output. MIMO is a method for multiplying the capacity of a radio link using multiple transmit and receive beams that may be achieved via multiple transmit and receive antennas to exploit multipath signal propagation. In a MIMO system, the information-carrying capacity of a wireless link may be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

1. In single-user MIMO, the transmitter sends one or more streams to the same receiver, taking advantage of capacity gains associated with using multiple Tx, Rx antennas in rich scattering environments where channel variations can be tracked.
2. The receiver may track these channel variations and provide corresponding feedback to the transmitter. This feedback may include channel quality information (CQI), the number of preferred data streams (e.g., rate control, a rank indicator (RI)), and a precoding matrix index (PMI).

Massive MIMO: a MIMO system with a very large number of antennas (e.g., greater than an 8×8 array).

AS: access stratum. A functional grouping consisting of the parts in the radio access network and in the UE, and the protocols between these parts being specific to the access technique (i.e., the way the specific physical media between the UE and the radio access network is used to carry information).

NAS: non-access stratum. Protocols between UE and the core network that are not terminated in the radio access network.

RAB: radio access bearer. The service that the access stratum provides to the non-access stratum for transfer of user information between a UE and the core network.

Network slicing: a wireless communication network may be separated into a plurality of virtual service networks (VSNs), or network slices, which may be separately configured to better suit the needs of different types of services. Some wireless communication networks may be separated according to eMBB, IoT, and URLLC services.

eMBB: enhanced mobile broadband. Generally, eMBB refers to the continued progression of improvements to existing broadband wireless communication technologies such as LTE. eMBB provides for (generally continuous) increases in data rates and increased network capacity.

URLLC: ultra-reliable and low-latency communication. Sometimes equivalently called mission-critical communication. Reliability refers to the probability of success of transmitting a given number of bytes within 1 ms under a given channel quality. Ultra-reliable refers to a high target reliability, e.g., a packet success rate greater than 99.999%. Latency refers to the time it takes to successfully deliver an application layer packet or message. Low-latency refers to a low target latency, e.g., 1 ms or even 0.5 ms (in some examples, a target for eMBB may be 4 ms).

Duplex: a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and interference cancellation techniques. Full duplex emulation is frequently implemented for wireless links by utilizing frequency division duplex (FDD) or time division duplex (TDD). In FDD, the transmitter and receiver at each endpoint operate at different carrier frequencies. In TDD, transmissions in different directions on a given channel are separated from one another using time division multiplexing. That is, at sometimes the channel is dedicated for transmissions in one direction, while at other times the channel is dedicated for transmissions in the other direction.

OFDM: orthogonal frequency division multiplexing. An air interface may be defined according to a two-dimensional grid of resource elements, defined by separation of resources in frequency by defining a set of closely spaced frequency tones or sub-carriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

CP: cyclic prefix. A multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

Scalable numerology: in OFDM, to maintain orthogonality of the subcarriers or tones, the subcarrier spacing is equal to the inverse of the symbol period. A scalable numerology refers to the capability of the network to select different subcarrier spacings, and accordingly, with each spacing, to select the corresponding symbol period. The symbol period should be short enough that the channel does not significantly vary over each period, in order to preserve orthogonality and limit inter-subcarrier interference.

RSMA: resource spread multiple access. A non-orthogonal multiple access scheme generally characterized by small, grantless data bursts in the uplink where signaling over head is a key issue, e.g., for IoT.

QoS: quality of service. The collective effect of service performances which determine the degree of satisfaction of a user of a service. QoS is characterized by the combined aspects of performance factors applicable to all services, such as: service operability performance; service accessibility performance; service retainability performance; service integrity performance; and other factors specific to each service.

RS: reference signal. A predefined signal known a priori to both transmitters and receivers and transmitted through the wireless channel, and used for, among other things, for channel estimation of the wireless channel and coherent demodulation at a receiver.

DMRS: Demodulation reference signal. A predefined signal known a priori to both transmitters and receivers and transmitted through the wireless channel signal typically in UL transmissions that is used for channel estimation and for coherent demodulation.

PBCH: Physical Broadcast Channel. A broadcast channel may be used to transmit parameters used for initial access of a cell such as downlink system bandwidth and System Frame Number, and may include the use of a master information block (MIB) to transmit the parameters PSS/SSS: Primary Synchronization signal/Secondary Synchronization signal. Synchronization signals that are used by a UE to acquire a DL signal from an eNB or gNB, and are typically read prior to reading the PBCH.

RMSI: Remaining Minimum System Information. The RMSI carries the remaining minimum system information beyond PBCH for UE to camp and access the system. For example, RMSI carries RACH parameters for UE to perform random access in order to go to the connected state.

Radio Access Network

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), next generation NB (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1ms. Multiple subframes may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), single carrier frequency division multiple access (SC-FDMA) or Discrete Fourier Transform spread OFDM (DFT-S-OFDM), sparse code multiplexing (SCM), or other suitable multiplexing schemes.

Further, the air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) Tertiary Synchronization Signals (TSSs) and unified Physical Broadcast Channels (PBCHs)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
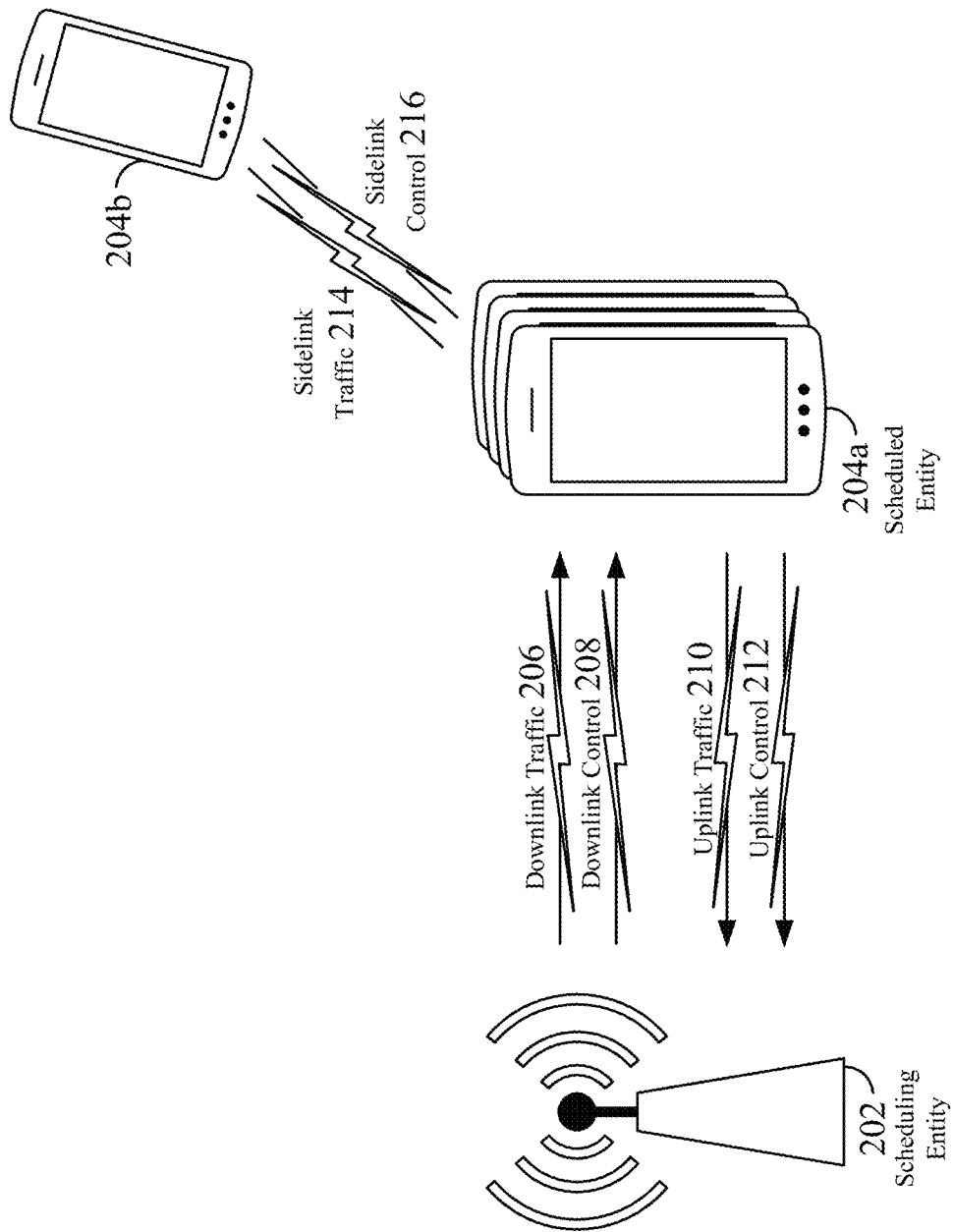
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a TSS, a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
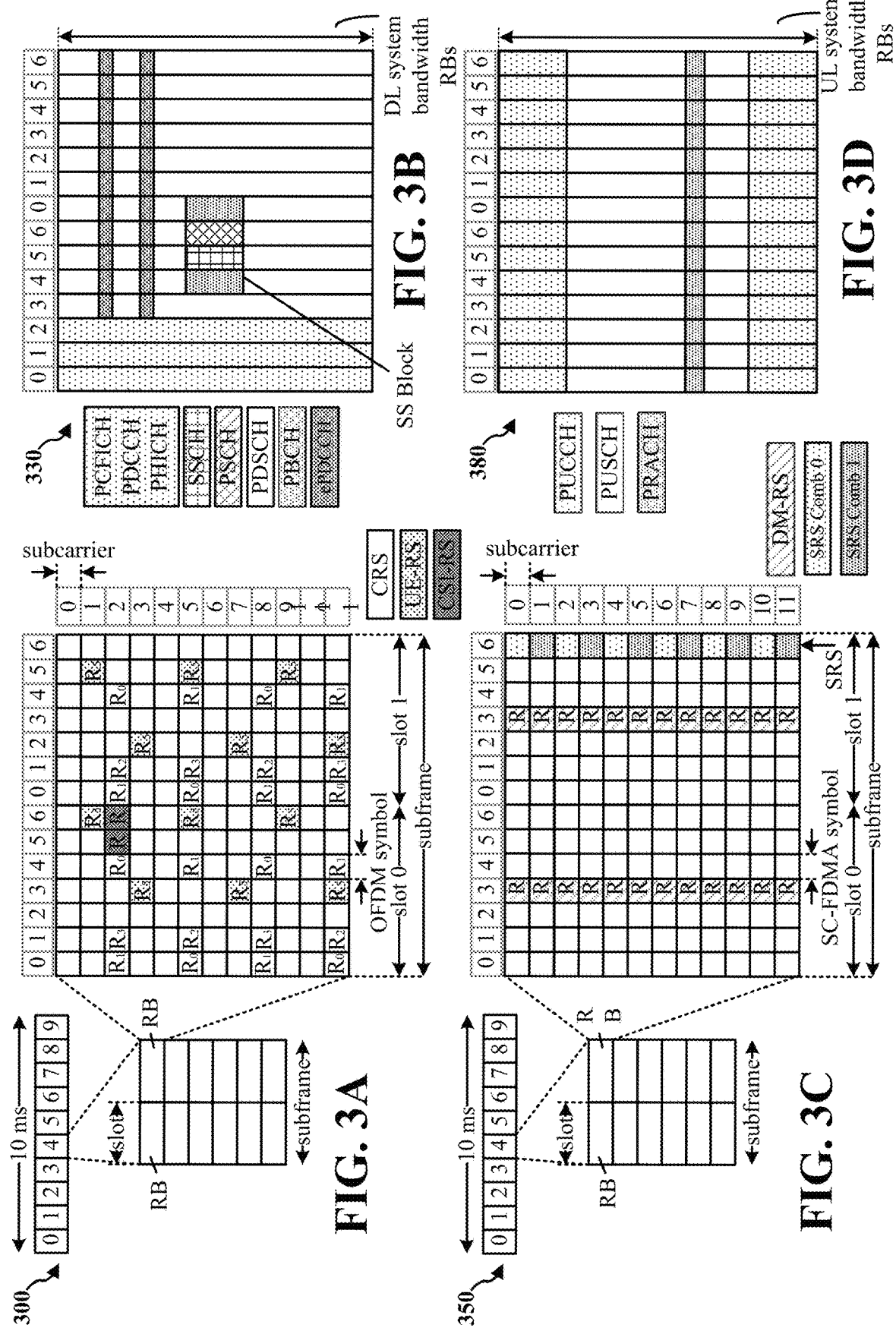
FIGS. 3A, 3B, 3C, and 3D are diagrams illustrating examples of a DL frame structure, DL channels within the DL frame structure, an UL frame structure, and UL channels within the UL frame structure, respectively.

FIG. 3A is a diagram 300 illustrating an example of a DL frame structure. FIG. 3B is a diagram 330 illustrating an example of channels within the DL frame structure. FIG. 3C is a diagram 350 illustrating an example of an UL frame structure. FIG. 3D is a diagram 380 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 3A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 3A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 3B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the hybrid automatic repeat request (HARQ) indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 4:
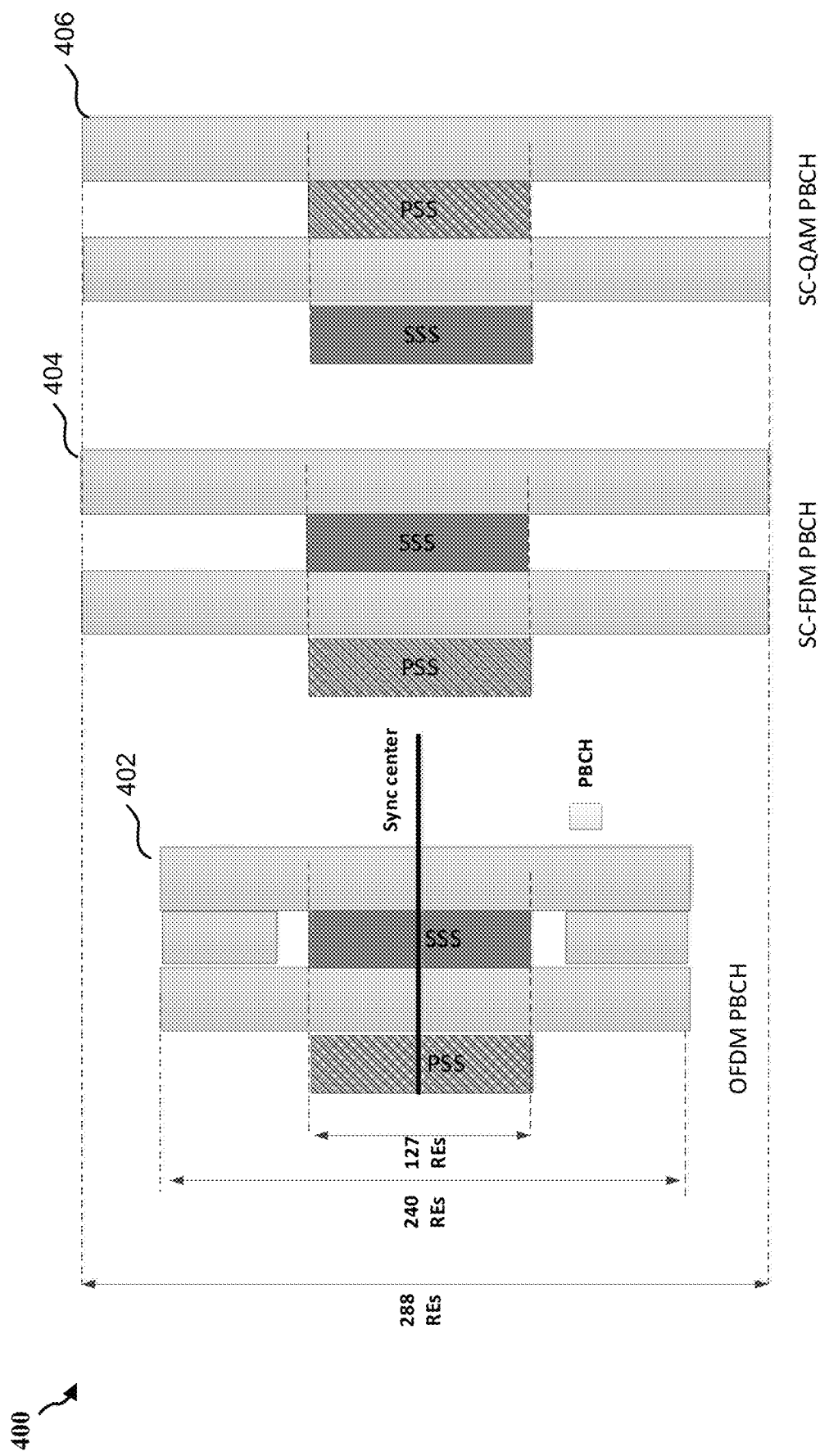
FIG. 4 is a diagram illustrating an indication of a physical broadcast channel (PBCH) waveform using of PSS/SSS/PBCH DMRS in accordance with one or more aspects of the present disclosure.

FIG. 4 is a diagram 400 illustrating an approach to indication of a PBCH waveform using locations of PSS/SSS/PBCH DMRS in accordance with one or more aspects of the present disclosure. Note that when multiple waveforms are supported, a UE within a cell may not know the waveform that the base station is using. Conversely, the base station may not know the waveform that a UE is using. In one example aspect, it may be beneficial to leverage the current NR PSS and SSS sequences for indicating multiple waveforms to the UEs within a cell. One reason for using the current NR PSS and SS sequences is that the PSS and SS use m-sequence which already exhibits low PAPR, suitable for reaching all UEs within a cell via a broadcast message. The PSS and SSS sequences may be implemented in time domain, which may be suitable for indicating various waveforms, including SC-FDM or SC-QAM for DL.

In one example aspect, when a gNB uses SC-QAM for PSS/SSS, it may add additional root-raised-cosine (RRC) filtering. However, it is expected that the receiver may be able to detect PSS/SSS with the same type of NR receiver without going through the RRC filtering with SC-QAM.

In one example, PBCH may use SC-FDM or SC-QAM instead of OFDM if the system only supports a single waveform for the sake of simplicity. For example, a new gNB or UE only supports SC-QAM in DL and UL. One proposal for waveform indication via the SS block for PBCH is to make use of the existing PSS detection of a current NR system. One reason is that the PSS detection needs to scan multiple timing hypotheses and is typically more complicated than SSS detection and PBCH decoding. Furthermore, it is preferable to keep the number of symbols in SS block to be the same as the SS block as defined in the NR standards, to allow for beam sweeping of SS blocks with similar overhead. In addition, since PBCH decoding is more complicated than the SSS detection, it is preferable that the waveform is detected prior to PBCH decoding. Accordingly, one proposal is to use different PSS/SSS locations in combination with PBCH DMRS to indicate a PBCH waveform, using a blind detection on SSS or PBCH DMRS. In one example aspect, SS block for indicating the OFDM and SC waveform may span different number of resource blocks.

One proposal, according to one example aspect of the present disclosure, is to use different PSS, SSS, and PBCH DMRS locations to indicate whether PBCH is transmitted via OFDM/SC-FDM or SC-QAM waveform. With the single carrier (SC) option, the PBCH bandwidth may be increased because with the SC option, the PBCH and SSS may not be able to be multiplexed in frequency domain as in a NR system and may need to be multiplexed in time domain. Furthermore, the minimum bandwidth and synchronization raster are less restricted in 60 GHz band than in lower frequency bands. With SC-FDM, the PBCH DMRS and data may be multiplexed in time domain prior to the discrete Fourier transform (DFT) step. Furthermore, with SC-QAM, the PBCH DMRS and data are multiplexed in time domain and the filtering may be applied afterwards. Since there may be a CP in time domain between DMRS and data, the CP overhead may be reduced to a minimum.

The diagram 400 of FIG. 4 illustrates indicating three different waveforms for PBCH, via three PSS-SSS location patterns 402, 404, and 406. The three PSS-SSS location patterns are distinguished by different locations of PSS and SSS and/or PBCH DMRS. In one example design, a FDM waveform is distinguished from a non-FDM waveform by the locations of PSS and SSS within a SS block. For example, the non-FDM waveform such as the SC-QAM waveform, is indicated by the PSS-SSS pattern 406. The PSS-SSS location pattern 406 has the SSS preceding the PSS. In contrast, a FDM waveform such as OFDM or a SC-FDM may be indicated by the PSS-SSS location pattern 402 or the PSS-SSS location pattern 404. Both the PSS-SSS location patterns 402 and 404 have the PSS preceding the SSS with a one-symbol gap in between. Thus, a UE, when receiving a SSS, followed by a symbol and then by a PSS, becomes aware that SC-QAM is the waveform for the PBCH and may use SC-QAM to decode the PBCH, if SC-QAM is supported by the UE.

When the UE detects the PSS-SSS location pattern 402 or the PSS-SSS location pattern 404, the UE knows that a FDM waveform is used for the PBCH. However, the UE may not know whether the FDM-based waveform is the OFDM waveform or SC-FDM waveform. In one example aspect, the OFDM and SC-FDM is further distinguished by the PBCH DMRS. For example, the DMRS for the OFDM waveform uses a pseudo-random sequence while the DMRS for SC-FDM uses a zadoff-chu sequence. Thus, if the UE successfully detects OFDM DMRS for the PBCH, the UE knows that the OFDM waveform is used for the PBCH. Otherwise, the UE knows that the SC-FDM waveform is used, assuming the ODFM waveform and SC-FDM waveform are the only members for the FDM-based waveform group.

The diagram 400 illustrates one example design for indications of different waveforms, via locations of PSS and SSS, and PBCH DMRS. A variety of designs may be derived from the concept of indicating multiple waveforms with PSS/SSS/PBCH DMRS locations. For example, different numbers of symbols may be used for the gap between the PSS and SSS to convey information related to the waveforms.

In one example aspect, a gNB may support multiple waveforms while a UE may only support one particular waveform. In such a case, the gNB may transmit a SS block to indicate the waveform for PBCH via multiple waveforms so that the UE may have a better chance to decode the SS block with a supported waveform. The different waveforms may be sent either at various times or frequencies at different raster points.

Figure 5A:
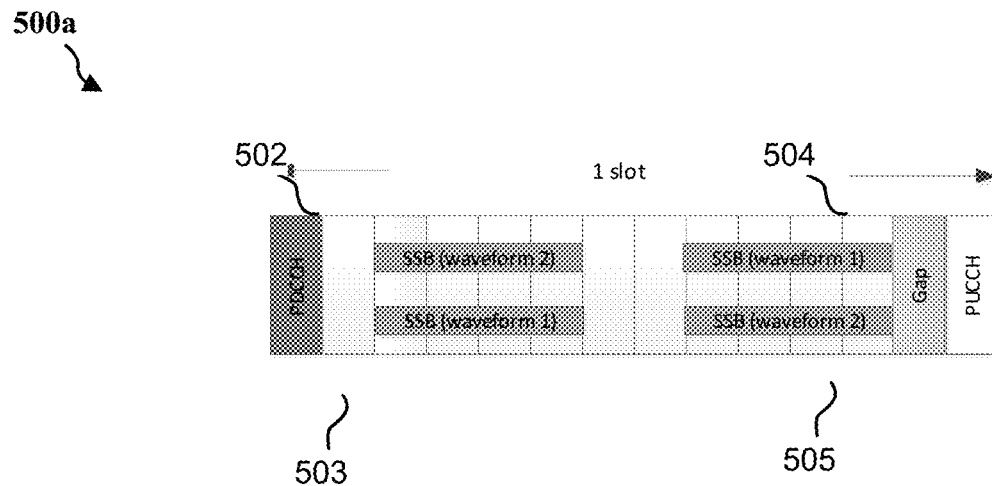
FIG. 5a is a diagram illustrating an indication of multiple waveforms in accordance with one or more aspects of the present disclosure.
Figure 5B:
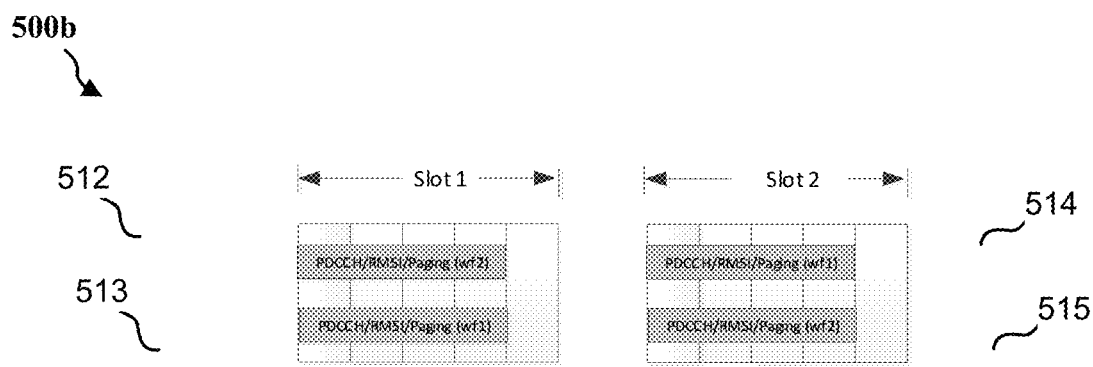
FIG. 5b is a diagram illustrating an indication of multiple waveforms in accordance with one or more aspects of the present disclosure.

FIGS. 5a and 5b illustrate indications of PBCH in more than one waveforms in both time and frequency domains. For example, FIG. 5a illustrates a multiple waveform indication pattern 500a, where a SS block may be sent in two different waveforms, waveform 2 and waveform 1, at different frequencies, as shown in 502 and 503, or 504 and 505 of 500a. Furthermore, the same SS block may be sent in the different waveforms, waveform 2 and waveform 1, in time domain, as shown in 502 and 504, or 503 and 505.

FIG. 5b shows a diagram 500b illustrating an indication of multiple waveforms for RMSI/paging and the associated PDCCH, in accordance with one or more aspects of the present disclosure. In frequency domain, the gNB may indicate two waveforms for RMSI/paging and the corresponding PDCCH used to schedule RMSI/paging, wf2 (512) and wf1 (513) under slot 1 and wf1 (514) and wf2 (515) under slot 2. In time domain, the gNB may indicate two different waveforms, i.e., wf1 and wf2 for PDCCH/RMSI/paging under slot 1 (512 and 513) and slot 2 (514 and 515). The RMSI carries the remaining minimum system information beyond PBCH for the UE to camp and access the system. For example, RMSI carries RACH parameters for the UE to perform random access in order to go to the connected state.

Figure 6:
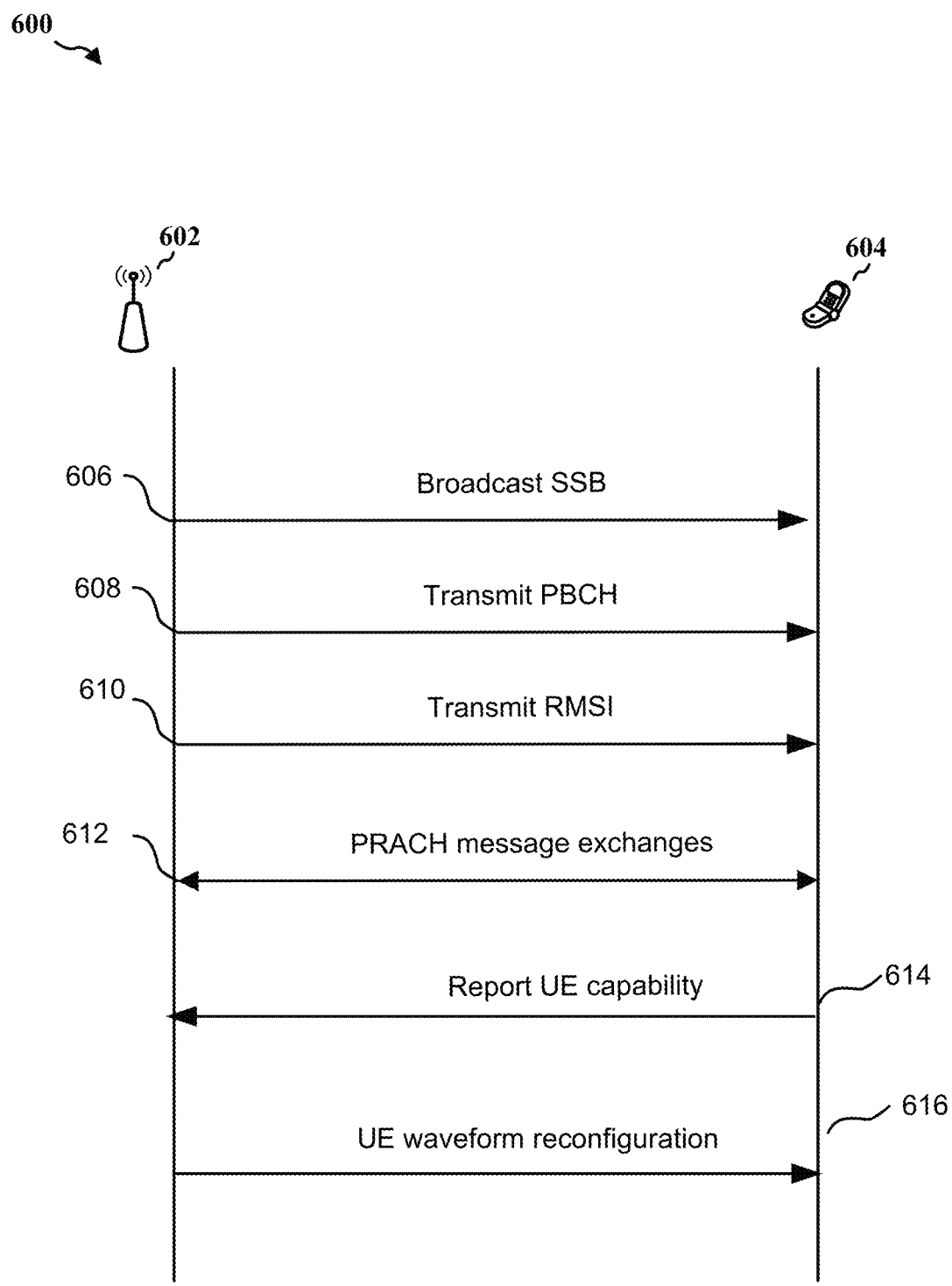
FIG. 6 illustrates an example of a wireless communications system that supports indications of multiple waveforms in accordance with one or more aspects of the present disclosure.

FIG. 6 illustrates an example of a wireless communications system 600 that supports waveform indications in accordance with one or more aspects of the present disclosure. The example wireless communications system 600 includes a base station 602 and a UE 604. The base station 602 may be a gNB and the UE 604 may support multiple waveforms for the high-frequency bands.

At 606, the base station 602 broadcast at least one SS block, indicating to all UEs within the cell a waveform for a broadcast channel. If the UE 604 cannot decode the SS block, then the UE 604 is unable to connect to and communicate with the base station 602. When the UE 604 within the cell receives the SS block and successfully decodes the SS block, the UE at least can support the waveform that the base station 602 uses to transmit the SS block. Then the UE 604 may determine a waveform for a physical broadcast channel (PBCH), based on the received SS block.

In one example aspect, when multiple waveforms are supported by either the gNB, the UE or both, the gNB or the UE may use a waveform for RMSI and/or a paging channel and the associated PDCCH that is either same as or different from the waveform for PBCH. For example, the gNB may use OFDM for SS block but use a SC waveform for RMSI and the associated PDCCH. Additionally, the gNB and/or UE may use different waveforms for RMSI and paging and the associated PDCCH. Thus, there is a need for the gNB and the UE to communicate to the other party the information related to the waveform for RMSI/paging and the associated PDCCH. In one example aspect, a field in PBCH payload may be used to indicate the waveform for PDCCH RMSI/paging.

In one example aspect, the UE may use the same waveform for PDCCH/RMSI/Paging as the one for PBCH. For example, when the UE detects the SS block with a waveform, the UE may follow the same waveform to detect RMSI and the associated PDCCH. In an alternative example, the gNB may use PBCH to explicitly indicate to the UE the waveform used for RMSI/Paging and the associated PDCCH.

In addition, some RMSI/paging and the associated PDCCH may be transmitted with one waveform while some other RMSI/Paging/PDCCH may be transmitted with another waveform in case the UE only supports a particular waveform. The different waveform can be sent either in different time or different frequency such that it can be decoded by the UE which only supports a particular waveform.

At 608, the base station 602 transmits a PBCH, indicating to the UEs within the cell a waveform for DL signaling channels, such as RMSI/paging and the associated PDCCH. At this point of the waveform indication procedure, the base station 602 uses shared broadcast channel such as PBCH to inform all the UEs within the cell of the waveform for the system information that a UE uses for access to the base station 602. Additionally, the base station 602 may also indicate in the PBCH a waveform for the uplink transmissions by the UE 604.

At 610, the base station 602 transmits a DL signaling channel such as RMSI, using the waveform indicated in the PBCH. The DL signaling such as RMSI may include remaining minimum system information such as supported frequencies, RACH parameters, and other information that a UE needs to initiate an access to the base station 602. The base station 602 may also indicate in the RMSI a waveform for the uplink transmissions for the UE 604. In one example aspect, if all the waveform candidates can be supported by a node (i.e., no capability issue), the same concept of using RMSI to indicate an UL waveform may be applied to both DL and UL transmissions as well for high-frequency 60 GHz bands. In this case, RMSI may indicate the waveform used for PDCCH/PDSCH/PUCCH/PUSCH.

At this point, the UE 604 may initiate a random access procedure to gain access to the base station 602, since the UE 604 is already informed of the waveform for the uplink transmissions, assuming that the UE supports the waveform for the uplink transmissions.

At 612, the base station 602 and the UE 604 engage in a message exchanges for the UE 604 to access the base station 602 and the associated system. The message exchange is also referred to the physical random access channel (PRACH) procedure. There may be two types of PRACH procedures: contention based, and non-contention based. For the non-contention based, the UE uses the dedicated preamble allocated by base station. The non-contention based PRACH procedure may be used in situations such as a handover. For the contention based PRACH procedure, the preamble is selected by the UE itself. While doing RACH procedure several UEs may select the same preamble, so additional contention resolution may be used.

During the PRACH procedure, the UE 604 may first send a preamble to the base station 604. The preamble is like an access token to ensure that the number of UEs accessing the base station at the same time is within a system-specified limit. The preamble sent from the UE 604 to the base station 602 is also referred to as the first message of PRACH procedure, or PRACH message 1. The time and frequency occasion used for the UE 604 to send the preamble may be used to determine a Random Access-Radio Network Temporary Identifier (RA-RNTI). In NR, the preamble uses Zadoff-chu sequence which exhibits low PAPR. Therefore, it is expected that the same preamble sequence will be used for the UE supporting different waveform capability. If the network expects some UEs may only support a particular waveform, it may further allow a UE to convey its waveform capability in message 1 transmission. That is, for example, UEs which can only support SC-QAM waveform may only use a subset of preamble sequences while a UE can support OFDM/SC-FDM waveform may use another subset of preambles while a UE can support all waveforms may use yet another subset of preambles.

In response to the preamble message, the base station 602 sends a PRACH response message using the DL waveform that is indicated earlier to the UE 604. This response message may be referred to as the second PRACH message, or PRACH message 2. The PRACH response message may include, among other information, the resource allocated to the UE 604, such as resource block (RB) assignments and the base station identification information such as a temporary-cell RNTI (T-CRNTI). If some UEs only support a particular waveform, network may send PRACH message 2 in multiple waveforms.

In response to the PRACH response message, the UE 604 transmits a connection request message using the indicated UL waveform for setting up a connection to the base station 602, using the received T-CRNTI information. This connection request message is also referred to as the third PRACH message, or PRACH message 3. If the UE 604 only supports a particular waveform, the base station may transmit the PRACH message 3 using its supported waveform and may further indicate its waveform in PRACH message 3 for both DL and UL transmissions.

In response to the connection request message, the base station 604 may send a connection setup message. This is also referred to as the fourth PRACH message, or PRACH message 4. The connection setup message may include a unique identification CRNTI for the connection between the UE 604 and the base station 602. From this point forward, the CRNTI is used in all messages between the UE 604 and the base station 602 related to the connection between the UE 604 and the base station 602.

At 614, once a connection is established between the UE 604 and the base station 602, the UE may report the UE capability to the base station. The UE capability may include the UE supported waveform(s). The UE supported waveform may be same or different from the indicated UL or DL waveforms, as described above.

At 616, the base station 602 may send a resource configuration message, including a UE waveform reconfiguration instruction, based on the received UE capability report. The base station 602 may reconfigure the UE waveforms, based on the reported UE waveform capabilities, the waveform capabilities at the base station, and other factors, to maximize the transmission efficiency and improve link budget. The base station 602 may also choose not to reconfigure the UE waveforms, if there is not such a need. It is also possible that some UE only supports a particular waveform (e.g., SC-QAM only) for one reason or another. In this case, the waveform configuration needs to be UE specific depending on the UE supported waveform and may be difficult to be signaled in the RMSI. In an alternative aspect, the base station may use other signaling mechanisms such as RRC, MAC-CE or DCI to indicate a UE-specific waveform.

The wireless communication system 600 illustrates one example procedure for indications of waveforms supported by the base station and the UE. Different procedure with more or fewer steps are all possible and within the spirit of the present disclosure.

Figure 7:
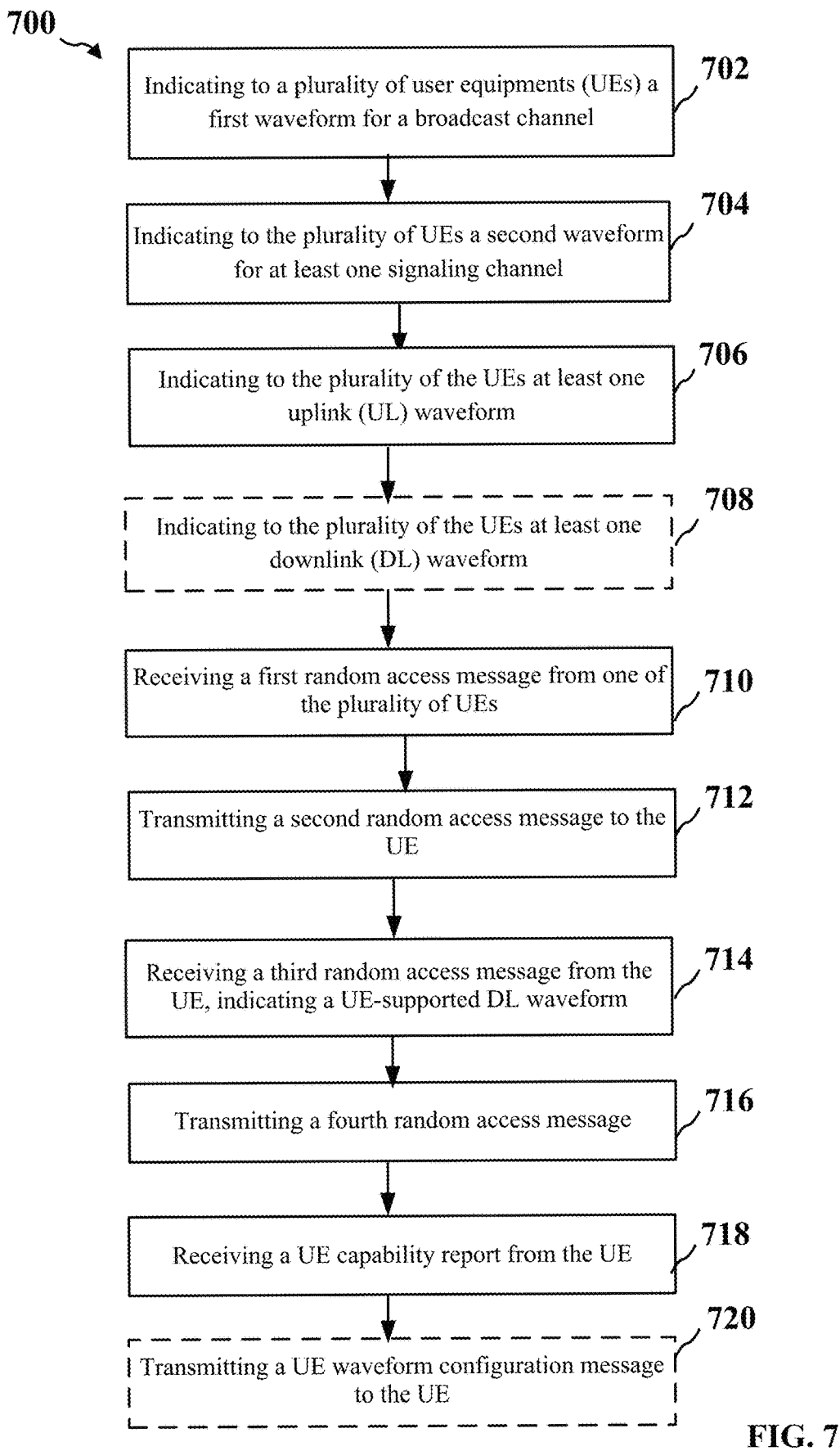
FIG. 7 is a flowchart of a method of wireless communication in accordance with one or more aspects of the present disclosure.

FIG. 7 is a flowchart of a method 700 for wireless communication in accordance with one or more aspects of the present disclosure. The method 700 may be performed by one of the base stations 110, 112 or 116 of FIG. 1, the base station 602 of FIG. 6, or apparatus 802/802' of FIGS. 8 and 9. An optional step is indicated in a dashed boarder.

At 702, the method 700 includes indicating to a plurality of UEs a first waveform for a broadcast channel. The base station may indicate to all the UEs within the cell a waveform that is used for a broadcast channel, such as PBCH. If a UE is unable to decode the indication contained in a SS block, then the UE will not be able to connect to the base station. After decoding the SS block, the UE knows the waveform that the base station will use for the physical broadcast channel (PBCH).

At 704, the method 700 includes indicating to the plurality of UEs a second waveform for at least one signaling channel. The base station, after broadcasting the SS block, uses the same waveform for PBCH or use the PBCH to indicate a waveform for downlink signaling channel. In one example aspect, the DL signaling channel may include physical downlink control channel (PDCCH) for carrying downlink control information and formats. The DL signaling channel may also include RMSI. The DL signaling channel may also include paging channels for the base station to page a UE. In a multi-waveform environment, the waveform for the signaling channel may be same as or different from the waveform for the PBCH.

At 706, the method 700 includes indicating to the plurality of the UEs within a cell at least one uplink (UL) waveform. The base station may use a signaling channel such as a RMSI channel to indicate to the UEs an UL waveform. At least one effect of informing the UEs of the waveform for uplink (UL) transmissions is that a UE may start a physical random access procedure to gain access to the system. In a multi-waveform environment, the UL waveform may be same as or different from the waveform for the broadcast channel.

At 708, the method 700 may include indicating to the UEs at least one DL waveform. The base station may use a signaling channel such as a RMSI channel to indicate to the UEs a DL waveform. If the DL waveform is same as the waveform for the broadcast channel or signaling channel, the base station may choose not to explicitly indicate the DL waveform to the UEs. In a multi-waveform environment, the DL waveform may be same as or different from the UL waveform, the waveform for the broadcast channel or the waveform for the signaling channel. At this point, the base station and a UE within the cell know the waveform(s) the other party supports for DL or UL transmissions, assuming that the UE can decode the signaling channel that the base station sent to the UE.

At 710, the method 700 includes receiving a first random access message from a UE within the cell. In one aspect, the first random access message the base station receives is a PRACH preamble. In one example aspect, the random access procedure is non-synchronized, which means the UE which initiates the random access procedure is not uplink synchronized yet (It may be, however, already downlink synchronized). Thus, the random access procedure of this UE may not interfere with the uplink transmission of other already uplink synchronized UEs. The time and frequency occasion used for the UE to send the preamble may be used to determine the RA-RNTI for the UE.

At 712, the method 700 includes transmitting a second random access message to the UE. In one example aspect, the second message, or PRACH message 2, is a PRACH response message. In response to the preamble message, the base station sends a PRACH response message using the DL waveform that is indicated earlier to the UE. The PRACH response message may include, among other information, resource allocated to the UE, such as resource block (RB) assignments, and the base station identification information such as a T-CRNTI. If the UE only supports a particular waveform, network may send the second PRACH message in multiple waveforms.

At 714, the method 700 includes receiving a third random access message from the UE. In one example aspect, the third random access message, or PRACH message 3, is a connection request message. In response to the PRACH response message, the UE may transmit the connection request message using the indicated UL waveform, for setting up a connection to the base station, using a temporary-cell RNTI (T-CRNTI), included in the PRACH message 2. In some cases, the UE may only support a particular waveform. As such, the UE may transmit the PRACH message 3 using its supported waveform and may further indicate its supported waveform for both for DL and UL transmission in the PRACH message 3.

At 716, the method 700 includes transmitting a fourth random access message to the UE. In one example aspect, the fourth random access message, or PRACH message 4, is a connection setup message. In response to the connection request message, the base station may send the connection setup message to allow the UE set up the connection to the base station. The connection setup message may include a unique identification CRNTI for the connection between the UE and the base station. From this point on, the connection has been established between the base station and the UE. The CRNTI is included in all messages between the UE and the base station related to the connection.

At 718, the method 700 includes receiving a UE capability report from the UE. Once a connection is established between the UE and the base station, the UE may report the UE capability to the base station. The UE capability may include the UE supported waveforms. The UE supported waveform may be same as or different from the indicated UL or DL waveforms.

At 720, the method 700 may include transmitting a UE waveform reconfiguration message to the UE. In one example aspect, the UE waveform reconfiguration message may be part of a UE resource configuration message. The base station may choose to reconfigure the UE waveforms, based on the waveforms supported at the base station and at the UE, and other factors, to maximize the transmission efficiency and to take into consideration some waveform related policies, among other factors. The base station may also choose not to reconfigure the DL waveform or UL waveform for the UE, if the UL waveform and DL waveform already indicated to the UE are the waveforms of the choice.

The method 700 may be triggered at various occasions. One such occasion is when the UE enters transmission range of the base station and just receives a SS block broadcast from the base station. The method 700 is for illustration purpose and shows one possible process for indicating waveforms to a UE in a NR access network. In practice, one or more steps shown in the illustrative flowchart for the method 700 may be combined with other steps, performed in any suitable order, performed in parallel (e.g., simultaneously or substantially simultaneously), or removed. For example, indicating at least one downlink waveform at 708 may be performed in parallel to indicating at least one uplink waveform at 1006.

Figure 8:
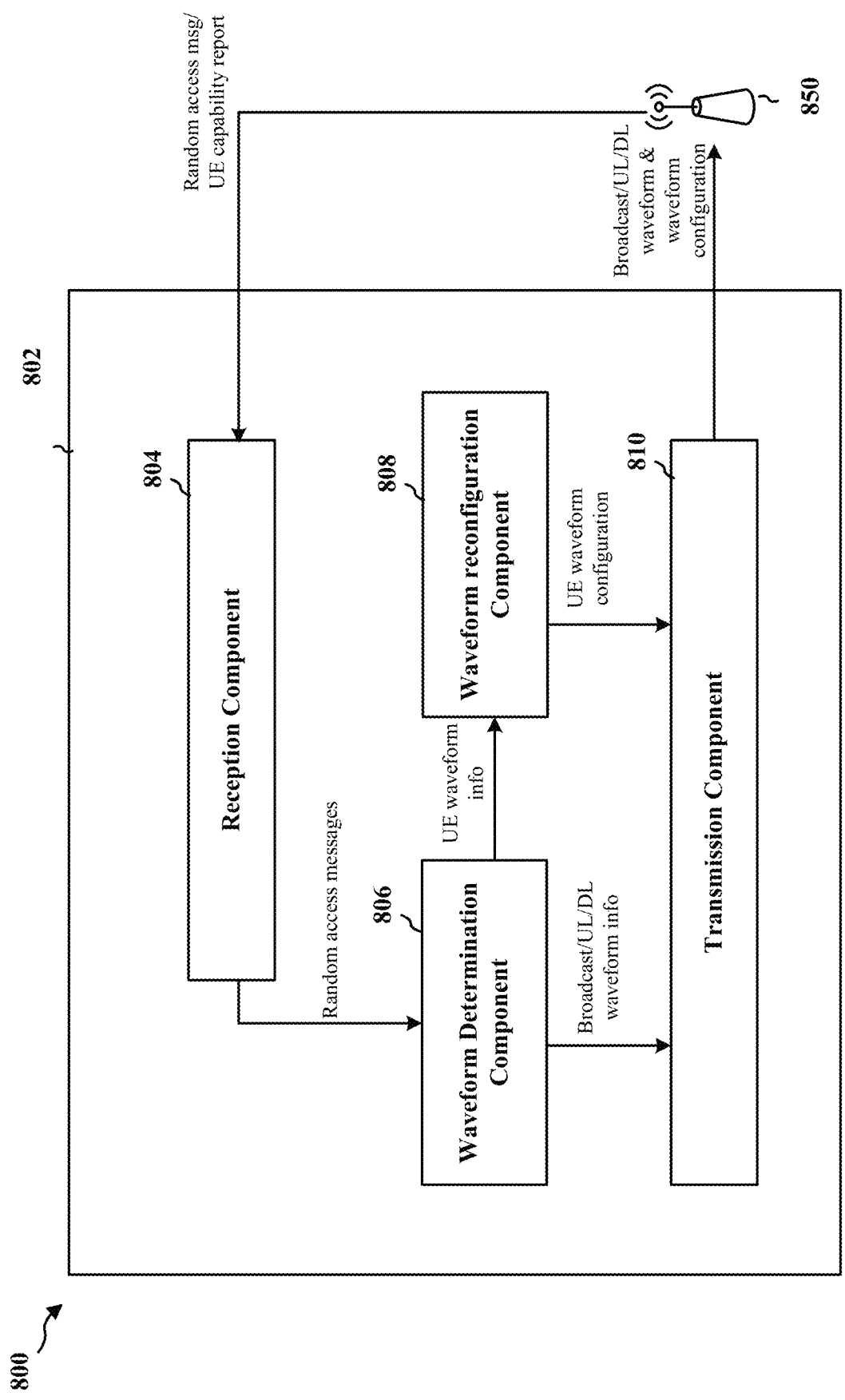
FIG. 8 is a conceptual data flow diagram illustrating the data flow between different means/components in an exemplary apparatus in accordance with one or more aspects of the present disclosure.

FIG. 8 is a conceptual data flow diagram 800 illustrating the data flow between different means/components in an exemplary apparatus 802. The apparatus may be a mmWave, high-frequency band capable base station in communication with a UE. The apparatus includes a reception component 804 that is configured to receive data and waveform related information from the UE. For example, the reception component 804 of the mmWave capable base station may receive one or more random access messages and a UE capability report from the UE.

The apparatus 802 also includes a waveform determination component 806 that receives random access message from the reception component 804, and determines a broadcast channel waveform, a DL waveform, and/or a UL waveform. The apparatus 802 also includes a waveform reconfiguration component 808 that receives UE waveform information from the waveform determination component 806, and determine whether to reconfigure the current UE waveforms, based in part on a UE capability report. The apparatus 802 further includes a transmission component 810 that transmits the determined or reconfigured waveforms to the UE 850.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
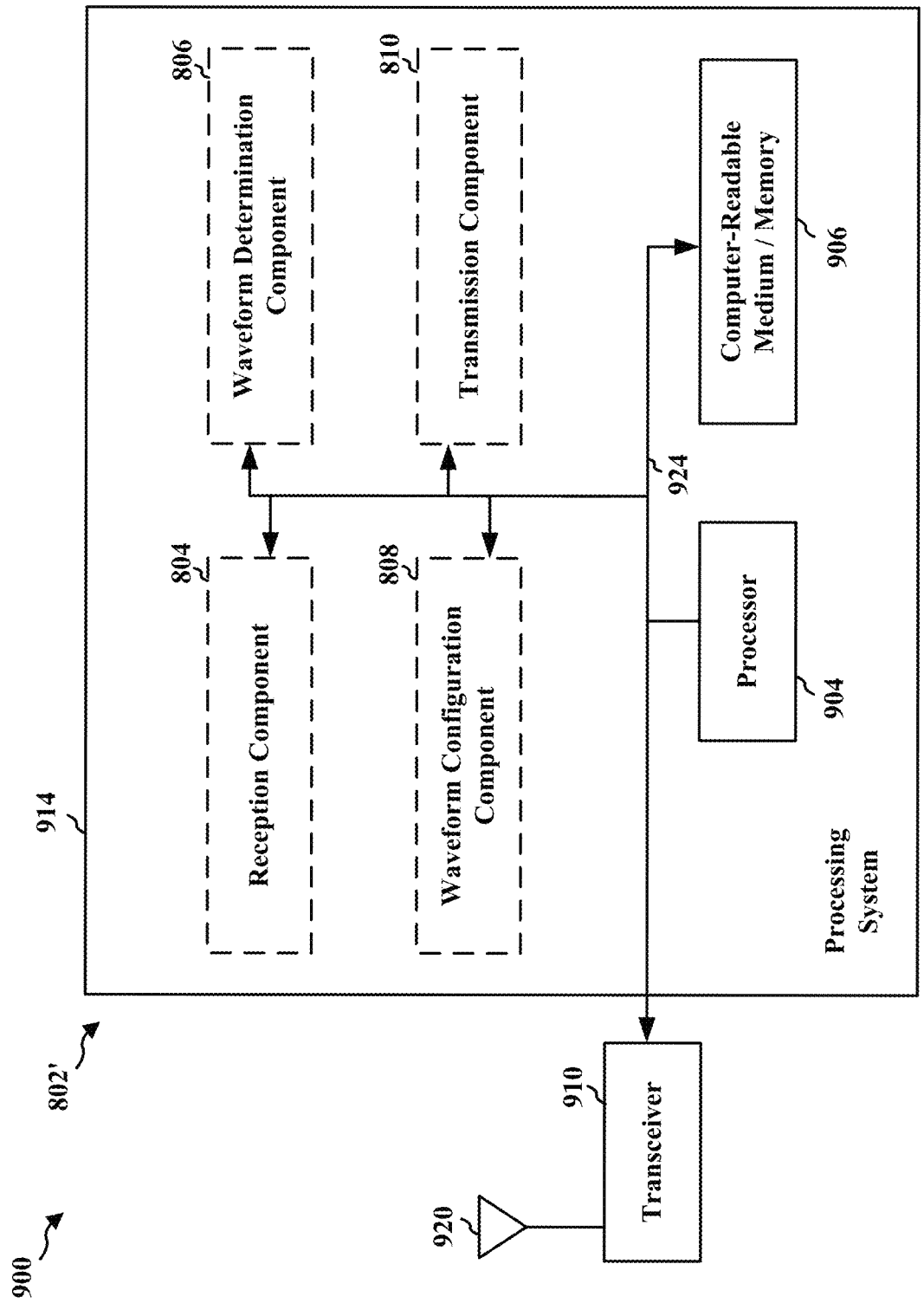
FIG. 9 is a diagram illustrating an example of a hardware implementation for an apparatus employing a processing system in accordance with one or more aspects of the present disclosure.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, and 810, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the transmission component 910. In addition, the transceiver 910 receives information from the processing system 914, specifically the reception component 804, and based on the received information, generates a signal to be applied to the one or more antennas 920.

The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, and 810. The components may be software components running in the processor 904, resident/stored in the computer readable medium/memory 906, one or more hardware components coupled to the processor 904, or some combination thereof. The processing system 914 may be a component of the scheduling entity 202 of FIG. 2 or base stations 110 and 112 of FIG. 1.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 10:
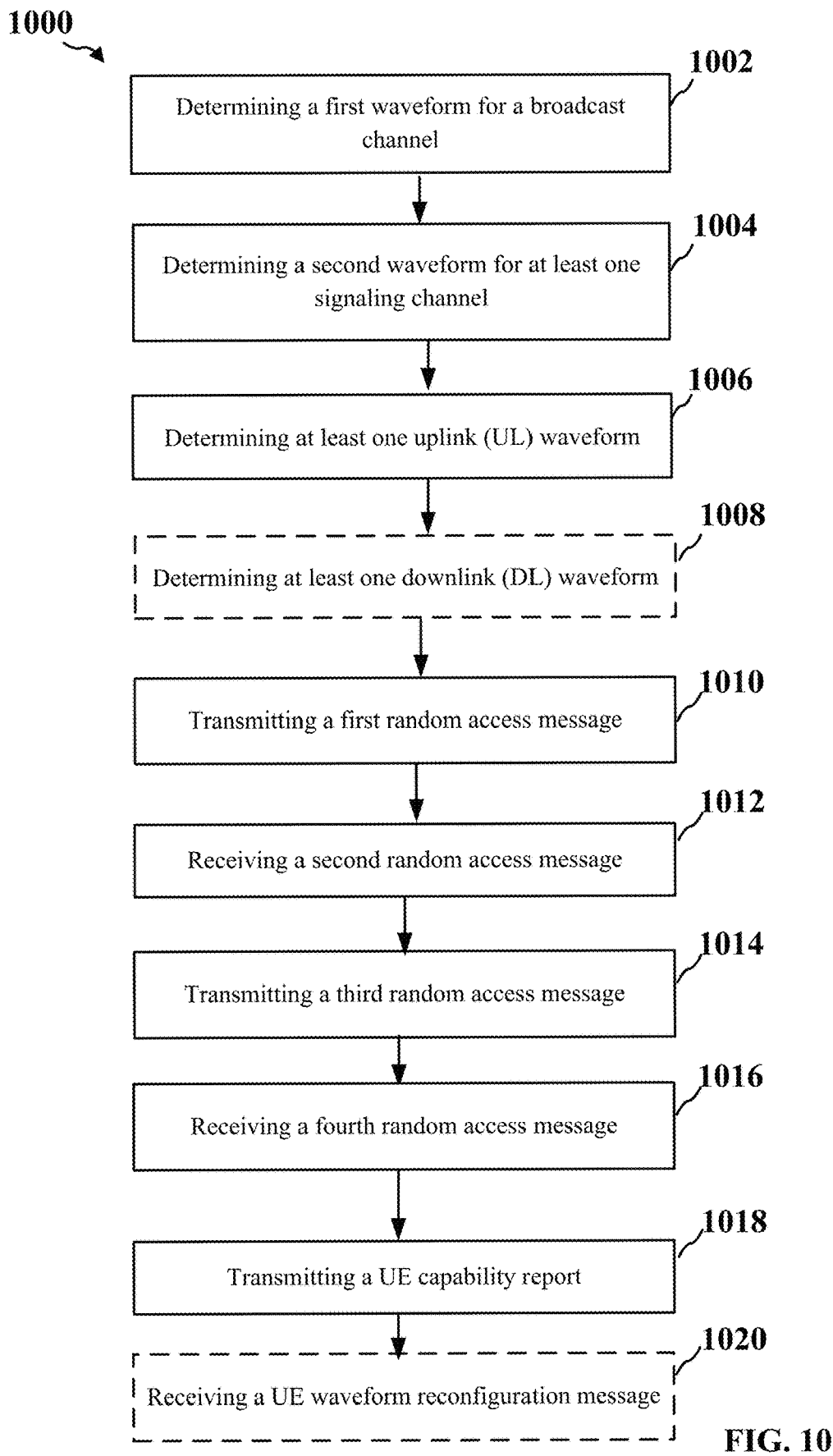
FIG. 10 is a flowchart of a method of wireless communication in accordance with one or more aspects of the present disclosure.

FIG. 10 is a flowchart of a method 1000 of wireless communication in accordance with one or more aspects of the present disclosure. The method 1000 may be performed by one of the UEs 120, 122, 124, 126, 128, 130, or 132 of FIG. 1, the UE 204a of FIG. 2, the UE 604 of FIG. 6, or apparatus 1102/1102' of FIGS. 11 and 12. An optional step is indicated in a dashed boarder.

At 1002, the method 1000 includes determining a waveform for a broadcast channel. The UE may determine the waveform for a broadcast channel by decoding a received SS block. The base station may indicate to all the UEs within the cell a waveform that is used for the broadcast channel, such as PBCH. If the UE is unable to decode the indication contained in a SS block, then the UE will not be able to connect to the base station. Otherwise, the UE knows the waveform that the base station will use for PBCH.

At 1004, the method 1000 includes determining a waveform for at least one signaling channel. After decoding the SS block, the UE knows the waveform for the PBCH. The UE may receive the PBCH in the determined waveform and then determine the waveform information indicated in the PBCH for at least one downlink signaling channel by decoding the received PBCH. In one example aspect, the DL signaling channel may include a RMSI channel. The DL signaling channel may also include paging channels for the base station to page a UE. The DL signal channel may also include a PDCCH associated with the RMSI and paging channel. In a multi-waveform environment, the waveform for the DL signaling channel may be same as or different from the waveform for the PBCH.

At 1006, the method 1000 includes determining at least one UL waveform. The UE may receive a signaling channel such as a RMSI that may indicate an UL waveform for the UE. At least one effect of determining the waveform for UL transmissions is that the UE may start a physical random access procedure to gain access to the system. In a multi-waveform environment, the UL waveform may be same as or different from the waveform for PBCH or the waveform for RMSI/paging and the associated PDCCH.

At 1008, the method 1000 includes determining at least one DL waveform. The UE may receive a signaling channel such as a RMSI channel to indicate an DL waveform for DL data transmissions. If the DL waveform is same as the waveform for the broadcast channel or the DL signaling channel, the UE may not receive any DL waveform indication because the base station may choose not to explicitly indicate the DL waveform to the UE. In a multi-waveform environment, the DL waveform may be same as or different from the UL waveform, the waveform for PBCH or the waveform for RMSI/paging and the associated PDCCH. At this point, the base station and the UE know the waveform the other party will use for DL or UL transmissions, assuming that the UE can decode the DL signaling channel that the base station sent to the UE.

At 1010, the method 1000 includes transmitting a first random access message. The UE may transmit a first random access message to the associated base station. Since the UE already know the UL waveform that the base station is expecting, the UE may send a first random access message to the base station to initiate a PRACH procedure. As indicated above, the first random access message, or PRACH message 1, may be a PRACH preamble. The preamble, among other information, may include the identification information for the UE, such as RA-RNTI.

At 1012, the method 1000 includes receiving a second random access message. The UE may receive the second random access message from the base station. In one example aspect, as indicated above, the second message, or PRACH message 2, is a PRACH response message. In response to the preamble from the UE to the base station, the base station sends a PRACH response message using the DL waveform that is indicated earlier to the UE. The PRACH response message may include, among other information, resource allocated to the UE, such as resource block (RB) assignments, and the base station identification information such as T-CRNTI.

At 1014, the method 1000 includes transmitting a third random access message. The UE may transmit the third random access message to the base station. In one example aspect, the third random access message, or PRACH message 3, is a connection request message. In response to the PRACH response message, the UE may transmit the connection request message using the T-CRNTI information included in the PRACH message 2.

At 1016, the method 1000 includes receiving a fourth random access message. The UE may receive a fourth random access message from the associated base station. In one example aspect, as indicated above, the fourth random access message, or PRACH message 4, is a connection setup message from the base station. The connection setup message may include a unique identification CRNTI for the connection between the UE and the base station. From this point forward, assuming no exception occurs, a connection has been established between the base station and the UE. The CRNTI is used in all messages between the UE and the base station on the connection.

At 1018, the method 1000 may include transmitting a UE capability report. Once a connection is established between the UE and the base station, the UE may report the UE capability to the base station. The UE capability may include the UE supported waveforms. The UE supported waveform may be same as or different from the indicated UL or DL waveforms. The UE may also choose to indicate its waveform capability in PRACH message 1 and/or message 3 prior to its capability report so that the exchanges between the base station and the UE can be based on the supported waveform.

At 1020, the method 1000 includes receiving a UE waveform reconfiguration message from the base station. The UE may receive a waveform reconfiguration message from the base station. In one example aspect, the UE waveform reconfiguration message may be part of a UE resource configuration message. The base station may choose to reconfigure the UE waveforms, based on the waveforms supported at the base station and at the UE, and other factors, to maximize the transmission efficiency, to improve link budget, and to take into consideration a waveform policy, among other factors. The base station may also choose not to reconfigure the DL waveform or UL waveform for the UE, if the UL waveform and DL waveform already indicated to the UE are the waveforms of the choice.

The method 1000 may be triggered for various occasions. One such occasion is when the UE enters transmission range of the base station and just receives a SS block broadcast from the base station. The method 1000 is for illustration purpose and shows one possible method for determining various waveforms for transmissions between the UE and the base station. In practice, one or more steps shown in illustrative flowchart for the method 1000 may be combined with other steps, performed in any suitable order, performed in parallel (e.g., simultaneously or substantially simultaneously), or removed. For example, determining at least one downlink waveform at 1008 may be performed in parallel to or at the same time as determining at least one uplink waveform at 1006.

Figure 11:
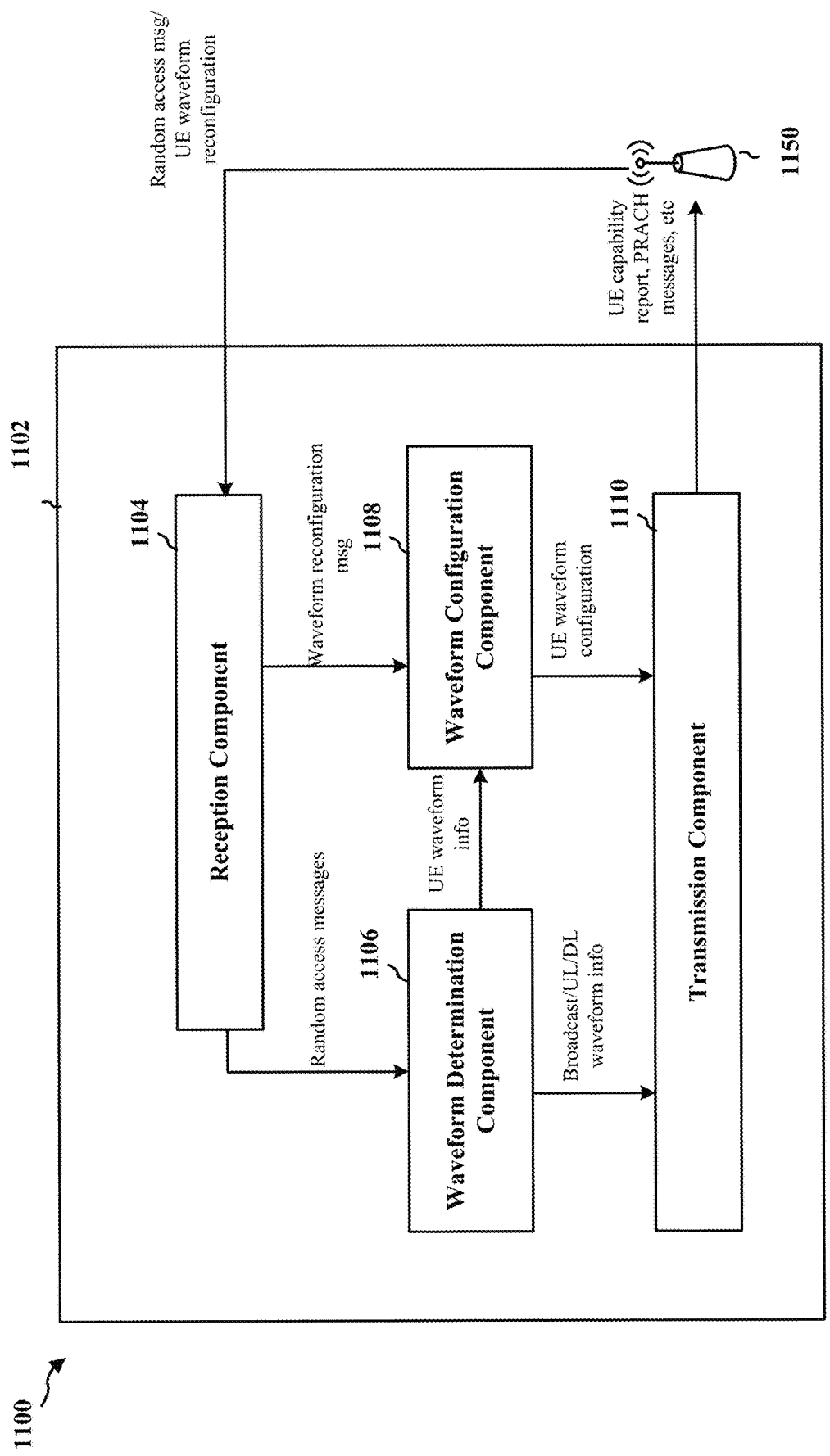
FIG. 11 is a conceptual data flow diagram illustrating the data flow between different means/components in an exemplary apparatus in accordance with one or more aspects of the present disclosure.

FIG. 11 is a conceptual data flow diagram 1100 illustrating the data flow between different means/components in an exemplary apparatus 1102. The apparatus may be a mmWave, high-frequency band capable UE in communication with a base station. The apparatus includes a reception component 1104 that is configured to receive data and control information from the base station. For example, the reception component 1104 of the mmWave capable UE may receive one or more random access messages and a UE waveform reconfiguration message from the base station.

The apparatus 1102 also includes a waveform determination component 1106 that receives random access messages from the reception component 1104, and determines a PBCH waveform, a DL waveform, and/or a UL waveform. The apparatus 1102 also includes a waveform configuration component 1108 that receives a waveform reconfiguration message from the reception component 1104, and reconfigure UE waveforms accordingly. The apparatus 1102 further includes the transmission component 1110 that transmits the UE capability report and PRACH messages to the base station 1150.

The apparatus may include additional components that perform each of the blocks of the algorithm in the aforementioned flowcharts of FIGS. 6 and 10. As such, each block in the aforementioned flowcharts of FIGS. 6 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
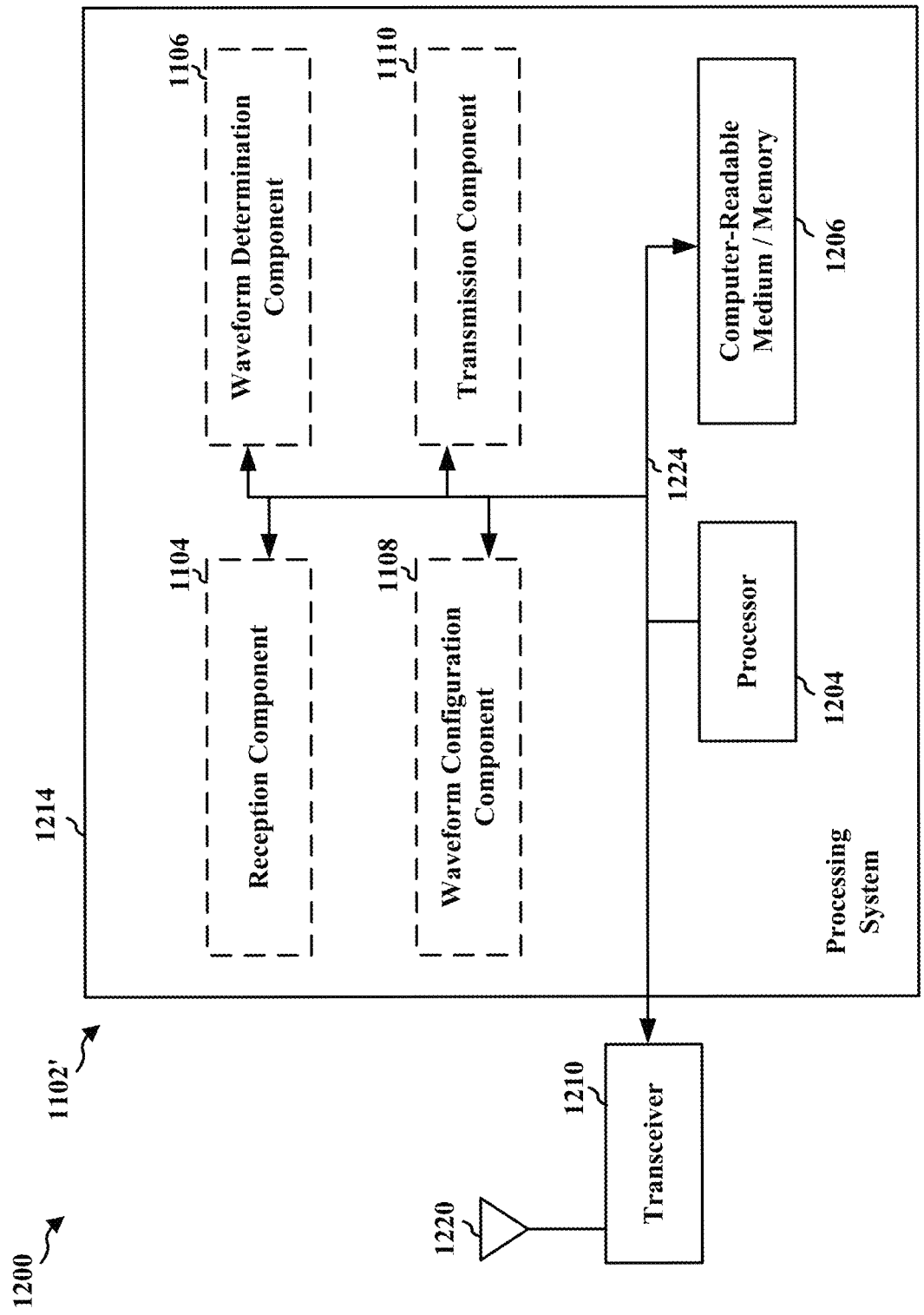
FIG. 12 is a diagram illustrating an example of a hardware implementation for an apparatus employing a processing system in accordance with one or more aspects of the present disclosure.

FIG. 12 is a diagram 1200 illustrating an example of a hardware implementation for an apparatus 1102' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the transmission component 1110. In addition, the transceiver 1110 receives information from the processing system 1114, specifically the reception component 804, and based on the received information, generates a signal to be applied to the one or more antennas 1120.

The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, and 1010. The components may be software components running in the processor 1104, resident/stored in the computer readable medium/memory 1106, one or more hardware components coupled to the processor 1104, or some combination thereof. The processing system 1114 may be a component of the scheduled entity 204 of FIG. 2 or UE 122-128 of FIG. 1.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, capable of millimeter wave (mmWave) communication, comprising
    indicating to a plurality of user equipments (UEs) a first waveform via a synchronization signal (SS) block using locations of the SS blocks within a time slot for a broadcast channel; and
    indicating to the plurality of UEs a second waveform for at least one signaling channel, via the broadcast channel, wherein the first waveform is same as or different from the second waveform.

2. The method of claim 1, further comprising at least one of:
    indicating to the plurality of the UEs at least one uplink (UL) waveform using one of the at least one signaling channel; or
    indicating to the plurality of the UEs at least one downlink (DL) waveform using one of the at least one signaling channel.

3. The method of claim 2, further comprising at least one of:
    receiving a first random access message from one of the plurality of UEs, using one of the at least one UL waveform;
    transmitting a second random access message to the UE using one or more of the at least one DL waveform;
    receiving a third random access message from the UE, indicating a UE-supported DL waveform and/or a UE-supported UL waveform; and
    transmitting a fourth random access message to the UE using the UE-supported DL waveform.

4. The method of claim 3, further comprising at least one of:
    receiving a UE capability report from the UE indicating at least a second UE-supported UL waveform and a second UE-supported DL waveform; and
    transmitting a UE waveform configuration message to the UE to reconfigure the at least one UL waveform and the at least one DL waveform for the UE, based on the received UE capability report.

5. The method of claim 4, wherein one of the first random access message and the third random access message indicates the UE-supported DL waveform for the UE when the UE-supported DL waveform is different from the at least one DL waveform and wherein the UE-supported DL waveform is same or different from the second UE-supported DL waveform.

6. The method of claim 3, wherein one of the first random access message and the third random access message indicates whether the UE-supported UL waveform is same as or different from the UE-supported DL waveform.

7. The method of claim 2, wherein indicating the at least one UL waveform further comprises indicating the at least one UL waveform based in part on physical random access channel (PRACH) resource allocations; and wherein indicating the first waveform for the broadcast channel further comprises indicating the first waveform in a frequency domain and/or a time domain; and wherein one of the PRACH resource allocations indicates one of the at least one UL waveform and wherein the PRACH resource allocations are sent to the plurality of UEs via the at least one signaling channel.

8. The method of claim 3, wherein one of the first waveform, the second waveform, the at least one UL waveform, the at least one DL waveform, the UE-supported UL waveform, the UE-supported DL waveform, the second UE-supported DL waveform, or the second UE-supported UL waveform comprises an orthogonal frequency divisional multiplexing (OFDM), or a single carrier-frequency division multiplexing (SC-FDM), or a single-carrier quadrature amplitude modulation (SC-QAM); and wherein the first random access message comprises a PRACH preamble, the second random access message comprises a PRACH response, the third random access message comprise a connection request, and the fourth random access message comprises a connection setup message.

9. The method of claim 1, wherein the broadcast channel comprises a physical broadcast channel (PBCH);
    the SS block comprises a primary synchronization signal (PSS), a secondary synchronization signal (SSS), the PBCH, and a PBCH demodulation reference signal (DMRS); and
    the at least one signaling channel comprises a remaining minimum system information (RMSI) channel, a physical downlink control channel (PDCCH), and/or a paging channel.

10. An apparatus of wireless communication at a base station, capable of millimeter wave (mmWave) communication, comprising
    a transceiver;
    a memory; and
    at least one processor coupled to the memory and configured to
    indicate to a plurality of user equipments (UEs) a first waveform via synchronization signal (SS) blocks using locations of the SS blocks within a time slot for a broadcast channel; and
    indicate to the plurality of UEs a second waveform for at least one signaling channel, via the broadcast channel, wherein the first waveform is same as or different from the second waveform.

11. The apparatus of claim 10, wherein the at least one processor is further configured to perform at least one of:
    indicating to the plurality of the UEs at least one uplink (UL) waveform using one of the at least one signaling channel; or
    indicating to the plurality of the UEs at least one downlink (DL) waveform using one of the at least one signaling channel.

12. The apparatus of claim 11, wherein the at least one processor is further configured to
    receive a first random access message from one of the plurality of UEs, using one of the at least one UL waveform;
    transmit a second random access message to the UE using one or more of the at least one DL waveform;
    receive a third random access message from the UE, indicating a UE-supported DL waveform and/or a UE-supported UL waveform; and
    transmit a fourth random access message to the UE using the UE-supported DL waveform.

13. The apparatus of claim 12, wherein the at least one processor is further configured to perform at least one of:
    receiving a UE capability report from the UE indicating at least a second UE-supported UL waveform and a second UE-supported DL waveform; and transmitting a UE waveform configuration message to the UE to reconfigure the at least one UL waveform and the at least one DL waveform for the UE, based on the received UE capability report.

14. The apparatus of claim 13, wherein one of the first waveform, the second waveform, the at least one UL waveform, the at least one DL waveform, the UE-supported UL waveform, the UE-supported DL waveform, the second UE-supported DL waveform, or the second UE-supported UL waveform comprises an orthogonal frequency divisional multiplexing (OFDM), or a single carrier-frequency division multiplexing (SC-FDM), or a single-carrier quadrature amplitude modulation (SC-QAM); and wherein the first random access message comprises a PRACH preamble, the second random access message comprises a PRACH response, the third random access message comprise a connection request, and the fourth random access message comprises a connection setup message.

15. A method of wireless communication at a user equipment (UE), capable of millimeter wave (mmWave) communication, comprising
determining a first waveform for a broadcast channel, based in part on received synchronization signal (SS) blocks from a base station, using locations of the SS blocks within a time slot; and
determining a second waveform for at least one signaling channel, based in part on the received broadcast channel, wherein the second waveform is same as or different than the first waveform.

16. The method of claim 15, further comprising at least one of:
determining at least one uplink (UL) waveform based in part on a received one of the at least one signaling channel; or
determining at least one downlink (DL) waveform based in part on the received one of the at least one signaling channel.

17. The method of claim 16, further comprising at least one of:
transmitting a first random access message to the base station, using one of the at least one UL waveform;
receiving a second random access message from the base station using one of the at least one DL waveform;
transmitting a third random access message to the base station, indicating a UE-supported UL waveform and/or a UE-supported DL waveform for the UE, via one of the at least one UL waveform; and
receiving a fourth random access message from the base station via the UE-supported DL waveform.

18. The method of claim 17, further comprising
transmitting a UE capability report to the base station indicating at least a second UE-supported UL waveform and/or a second UE-supported DL waveform; and
receiving a UE waveform configuration message from the base station to reconfigure the at least one UL waveform and the at least one DL waveform for the UE.

19. The method of claim 18, wherein one of the first random access message and the third random access message indicates the UE-supported DL waveform for the UE when the UE-supported DL waveform is different from the at least one DL waveform.

20. The method of claim 17, wherein one of the first random access message and the third random access message indicates whether the UE-supported UL waveform is different from or same as the UE-supported DL waveform.

21. The method of claim 15, wherein determining the first waveform for the broadcast channel further comprises determining the first waveform in a frequency domain and/or a time domain.

22. The method of claim 16, wherein the determining the at least one uplink (UL) waveform further comprises determining the at least one UL waveform based in part on physical random access channel (PRACH) resource allocations; and wherein one of the PRACH resource allocations indicates one of the at least one UL waveform and the PRACH resource allocations are received from the base station in at least one signaling channel.

23. The method of claim 15, wherein the broadcast channel comprises a physical broadcast channel (PBCH);
the SS block comprises a primary synchronization signal (PSS), a secondary synchronization signal (SSS), the PBCH, and a PBCH demodulation reference signal (DMRS); and
the at least one signaling channel comprises a remaining minimum system information (RMSI) channel, a physical downlink control channel (PDCCH), and/or a paging channel.

24. The method of claim 17, wherein one of the first waveform, the second waveform, the at least one UL waveform, the at least one DL waveform, the UE-supported UL waveform, the UE-supported DL waveform, or the second UE-supported UL waveform, comprises an orthogonal frequency divisional multiplexing (OFDM), a carrier-frequency division multiplexing (SC-FDM), or a single carrier-frequency division multiplexing (SC-FDM), or a single-carrier quadrature amplitude modulation (SC-QAM); and wherein the first random access message comprises a PRACH preamble, the second random access message comprises a PRACH response, the third random access message comprise a connection request, and the fourth random access message comprises a connection setup.

25. An apparatus for wireless communications at a user equipment (UE), capable of millimeter wave (mmWave) communication, comprising
a transceiver;
a memory; and
at least one processor coupled to the memory and configured to
determine a first waveform for a broadcast channel, based in part on received synchronization signal (SS) blocks from a base station, using locations of the SS blocks within a time slot; and
determine a second waveform for at least one signaling channel, based in part on the received broadcast channel, wherein the second waveform is same as or different than the first waveform.

26. The apparatus of claim 25, wherein at least one processor is further configured to perform at least one of:
determining at least one uplink (UL) waveform based in part on a received one of the at least one signaling channel; or
determining at least one downlink (DL) waveform based in part on the received one of the at least one signaling channel.

27. The apparatus of claim 26, wherein at least one processor is further configured to perform at least one of:
transmitting a first random access message to the base station, using one of the at least one UL waveform;
receiving a second random access message from the base station using one of the at least one DL waveform;
transmitting a third random access message to the base station, indicating a UE-supported UL waveform and/ or a UE-supported DL waveform for the UE, via one of the at least one UL waveform; and receiving a fourth random access message from the base station via the UE-supported DL waveform.

28. The apparatus of claim 27, wherein at least one processor is further configured to:

transmit a UE capability report to the base station indicating at least a second UE-supported UL waveform and/or a second UE-supported DL waveform; and receive a UE waveform configuration message from the base station to reconfigure the at least one UL waveform and the at least one DL waveform for the UE.

29. The apparatus of claim 27, wherein one of the first waveform, the second waveform, the at least one UL waveform, the at least one DL waveform, the UE-supported UL waveform, the UE-supported DL waveform, or the second UE-supported UL waveform, comprises an orthogonal frequency divisional multiplexing (OFDM), a carrier-frequency division multiplexing (SC-FDM), or a single carrier-frequency division multiplexing (SC-FDM), or a single-carrier quadrature amplitude modulation (SC-QAM); and wherein the first random access message comprises a PRACH preamble, the second random access message comprises a PRACH response, the third random access message comprise a connection request, and the fourth random access message comprises a connection setup.

* * * * *